United States Patent [19]
Koga et al.

[11] Patent Number: 5,839,800
[45] Date of Patent: Nov. 24, 1998

[54] BRAKING CONTROL SYSTEM FOR ELECTRIC AUTOMOBILE

[75] Inventors: Hisamitsu Koga; Naotake Kumagai; Tomiji Owada; Nobuya Furukawa; Masaaki Kato; Nobuyuki Kawamura, all of Tokyo, Japan

[73] Assignee: Mitsubishi Jidosha Kogyo Kabushiki Kaisha, Tokyo, Japan

[21] Appl. No.: 687,489

[22] PCT Filed: Dec. 4, 1995

[86] PCT No.: PCT/JP95/02471

§ 371 Date: Nov. 12, 1996

§ 102(e) Date: Nov. 12, 1996

[87] PCT Pub. No.: WO96/17741

PCT Pub. Date: Jun. 13, 1996

[30] Foreign Application Priority Data

Dec. 6, 1994 [JP] Japan .................................. 6-302523

[51] Int. Cl.⁶ ...................................................... B60T 13/74
[52] U.S. Cl. .............................. 303/152; 303/3; 318/376; 188/156
[58] Field of Search .................................... 303/152, 151, 303/3, 15, 20; 318/371, 376; 188/156, 158, 159

[56] References Cited

U.S. PATENT DOCUMENTS

| | | | |
|---|---|---|---|
| 4,313,080 | 1/1982 | Park | 320/61 |
| 4,671,577 | 6/1987 | Woods | 303/152 X |
| 4,962,969 | 10/1990 | Davis | 303/152 X |
| 5,322,352 | 6/1994 | Ohno et al. | |

FOREIGN PATENT DOCUMENTS

| | | |
|---|---|---|
| 0361708A2 | 4/1990 | European Pat. Off. . |
| 0570934 A2 | 11/1993 | European Pat. Off. . |
| 4235502 A1 | 4/1993 | Germany . |
| 4-355603 | 12/1992 | Japan . |
| 5-161215 | 6/1993 | Japan . |
| 6-105405 | 4/1994 | Japan ................................... 303/152 |

*Primary Examiner*—Peter M. Poon

[57] ABSTRACT

A braking control system for an electric automobile combines the use of mechanical braking and regenerative braking by a motor. Namely, a braking control system for the electrical automobile, which permits the combined use of regenerative braking and mechanical braking, is provided with target braking force setting unit (9) for setting a target braking force on the basis of a brake pedal stroke, regeneration control system (4A,5A) for setting a target regenerative braking force on the basis of the brake pedal stroke and then controlling regenerative braking by the motor in accordance with the target regenerative braking force, and mechanical braking control unit (24) for controlling operation of a mechanical brake system (B) in accordance with a difference between said target braking force and an actual braking force determined based on a detected deceleration of a vehicle. These features make it possible to surely obtain a desired braking force and also to promote the recovery of energy by regenerative braking.

8 Claims, 4 Drawing Sheets

BRAKING CONTROL SYSTEM FOR ELECTRIC AUTOMOBILE

TECHNICAL FIELD

This invention relates to an electric automobile which runs by driving wheels with an electric motor, and especially to a braking control system for an electric automobile so that braking of a vehicle is controlled relying upon regenerative braking by a motor.

BACKGROUND ART

In recent years, electric automobiles each of which drives wheels by an electric motor instead of an internal combustion engine have attracted an increasing interest from the viewpoint of prevention of air pollution and reduction of vehicle noise.

These electric automobiles easily allow so-called regenerative braking. This regenerative braking can be performed by limiting a supply of electric power to a drive motor and converting the motor into a power-generating state. At this time, a load is applied to each drive wheel so that, while braking the drive wheel, rotational energy of the drive wheel can be recovered as electric energy.

When a driver operates a brake pedal or the like to command braking in such an electric automobile, a braking force (regenerative braking force) as a result of regenerative braking by a motor is applied in addition to a braking force (mechanical braking force) by a mechanical brake (mechanical brake system) which produces the braking force by applying a frictional force to a wheel, whereby braking of the vehicle can be achieved.

In general, responsive to a braking command by a driver, a mechanical braking force is applied as a primary braking force and a regenerative braking force is added as an auxiliary braking force. It is important how to balance these mechanical braking force and regenerative braking force.

For example, Japanese Patent Application Laid-Open (Kokai) No. HEI 1-126103 (the first conventional art) discloses a technique in which a command braking force (target braking force) is set from a degree of operation of a brake pedal (which may hereinafter be called a "brake pedal stroke") and an acceleration of the operation of the brake pedal, a regenerative braking force produced at this time in accordance with the degree of operation of the brake pedal is determined, and a mechanical braking force is applied in association with the regenerative braking force to give the command braking force.

As another example, Japanese Patent Application Laid-Open (Kokai) No. HEI 1-198201 (the second conventional art) discloses a technique in which upon operation of brakes, regenerative braking is controlled to make the sum of a mechanical braking force and a regenerative braking force consistent with a target deceleration characteristic.

Further, Japanese Patent Application Laid-Open (Kokai) No. HEI 4-355603 (the third conventional art) discloses a technique in which a ratio of a regenerative braking force to a frictional braking force is computed by a brake controller from a displacement of a brake pedal detected by a displacement detector, a deceleration of a vehicle detected by a deceleration sensor and a vehicle speed detected by a vehicle speed sensor and a regenerative brake and frictional brakes are hence operated efficiently, thereby efficiently recovering regenerative energy and moreover applying a desired braking force to an electric automobile.

According to the above-described first conventional technique, the target braking force and the regenerative braking force are obtained from the degree of operation of the brake pedal and the acceleration of the operation of the brake pedal, and the difference between the target braking force and the regenerative braking force is replenished by the mechanical braking force. No problem would arise if a regenerative braking force is always produced corresponding to a degree of operation of the brake pedal and an acceleration of the operation of the brake pedal. A regenerative brake force is, however, not always produced corresponding to operation of the brake pedal as mentioned above.

Described specifically, for example, when the temperature of a battery is high, charging has to be limited or stopped to protect the battery from deterioration. At such a time, it is also necessary to limit or stop regenerative braking.

In the case of a hybrid electric automobile, which is equipped with a generator mounted thereon and driven by an internal combustion engine and can run while charging a battery with the generator, a charging voltage by regeneration may become higher than a voltage generated by the generator in the course of the generation of electric power. The generator is then brought into a no-load state, leading to the potential problem that the internal combustion engine may operate at an overspeed to develop a trouble. It is also necessary to limit or stop regenerative braking in such a situation.

As has been described above, no regenerative braking force may be obtained in some instances even if a brake pedal is operated. According to the first conventional technique, a regenerative braking force may still be applied corresponding to operation of the brake pedal even if no regenerative braking force is applied actually as described above. If a mechanical braking force is applied to supplement this regenerative brake force, no sufficient braking force can be obtained.

Further, occurrence of a trouble in a control circuit for regenerative braking may also lead to an insufficient braking force.

According to the second conventional technique, the inconsistency between the target deceleration characteristic and the mechanical braking force is conversely compensated by the regenerative braking force. This technique, however, also applies a mechanical braking force corresponding to operation of the brakes. If no regenerative braking force is obtained despite operation of the brake pedal as mentioned above, the braking force becomes insufficient to an extent as much as the regenerative braking force which is not available.

In addition, the mechanical braking force is used as a main braking force and the regenerative braking is used only as an auxiliary brake. Energy cannot therefore be recovered fully by regenerative braking.

According to the third conventional technique, the ratio of the regenerative braking force to the frictional braking force is computed by the brake controller from the displacement of the brake pedal, the deceleration of the vehicle detected by the deceleration sensor and the vehicle speed detected by the vehicle speed sensor, and the regenerative brake and the frictional brakes are hence operated at the above ratio. Here again, if no regenerative braking force is obtained despite operation of the brake pedal, the braking force becomes insufficient to an extent as much as the regenerative braking force which is not available.

With the foregoing problems in view, the present invention has as an object to provide a braking control system for an electric automobile, which makes it possible to surely obtain a desired braking force while using regenerative braking and mechanical braking in combination and further to promote recovery of energy by regenerative braking.

DISCLOSURE OF THE INVENTION

The present invention provides a braking control system for an electric automobile, said braking control system permitting combined use of regenerative braking by a motor and mechanical braking by a mechanical brake system upon application of brakes, comprising, brake pedal stroke detection means for detecting a stroke of a brake pedal; target braking force setting means for setting a target braking force on a basis of the brake pedal stroke detected by said brake pedal stroke detection means; regeneration control means for setting a target regenerative braking force on a basis of the brake pedal stroke, which has been detected by said brake pedal stroke detection means, and then controlling regenerative braking by said motor in accordance with the target regenerative braking force; deceleration detecting means for detecting a deceleration of a vehicle; and mechanical braking control means for controlling operation of said mechanical brake system in accordance with a difference between said target braking force and an actual braking force determined based on the detected deceleration from said deceleration detecting means.

Owing to such features, when braking is performed using regenerative braking and mechanical braking in combination, the target braking force setting means sets a target braking force on the basis of a brake pedal stroke detected by the brake pedal stroke detection means. Concerning the regenerative braking, the regeneration control means sets a target regenerative braking force on the basis of the brake pedal stroke detected by the brake pedal stroke detection means and in accordance with this target regenerative braking force, controls regenerative braking by a motor. In connection with the mechanical braking, on the other hand, the mechanical braking control means controls operation of the mechanical brake system in accordance with the difference between the target braking force set by the target braking force setting means and an actual braking force determined based on a detected deceleration from said deceleration detecting means. The mechanical braking force can therefore be produced to replenish the difference between the target braking force and the actual braking force so that, even if regenerative braking is not performed corresponding to operation of the brake pedal, the target braking force can still be produced surely.

The braking control system therefore has the advantage that a target braking force can always be applied surely by a mechanical braking force even when no regenerative braking force is obtained despite operation of the brake pedal. Further, the use of regenerative braking as a primary brake has the advantage that the recovery energy by regeneration can be sufficiently achieved and moreover, wearing of the mechanical brake system can be reduced.

It is also possible to additionally provide battery condition detecting means for detecting a condition of a battery, so that said regeneration control means sets the target regenerative braking force in accordance with the brake pedal stroke detected by said brake pedal stroke detection means and the condition of said battery detected by said battery condition detecting means.

These features make it possible to perform regenerative braking suited to the condition of the battery while making the regenerative braking correspond to a brake pedal stroke. It is therefore possible to promote the recovery of energy by regenerative braking and also to surely achieve the target braking force by a mechanical braking force while protecting the battery.

Further, said battery condition detecting means may detect a temperature of said battery, and said regeneration control means may reduce the target regenerative braking force, which is set based on the brake pedal stroke, as the temperature of said battery rises.

Owing to these features, the charging to the battery as a result of regenerative braking is also limited corresponding to a rise in the temperature of the battery. A battery undergoes severer deterioration by charging as the temperature of the battery becomes higher. Since the charging is limited as the temperature of the battery rises, the deterioration of the battery by its charging at high temperatures can be reduced. It is therefore possible to promote the recovery of energy by regenerative braking and also to surely achieve a target braking force by a mechanical braking force while reducing the temperature-dependent deterioration of the battery.

The braking control system may further comprise regenerated voltage detection means for detecting a voltage regenerated by said motor, and also generated voltage detection means for detecting a voltage generated by a generator which is driven by an internal combustion engine and is provided for charging a battery. Said regeneration control means may reduce the target regenerative braking force, which is set based on the brake pedal stroke, when the regenerated voltage exceeds the generated voltage.

These features enables to limit a charging voltage by regenerative braking, thereby making it possible to avoid such a situation that the generator may be brought into a no-load state. This can avoid overspeed operation of the internal combustion engine which drives the generator. It is therefore possible to promote the recovery of energy by regenerative braking and also to surely achieve a target braking force by a mechanical braking force while protecting the internal combustion engine which drives the generator.

BEST MODE FOR CARRYING OUT THE INVENTION

Based on FIG. 1 through FIG. 5, a preferred embodiment of the present invention will hereinafter be described.

Figure 1:
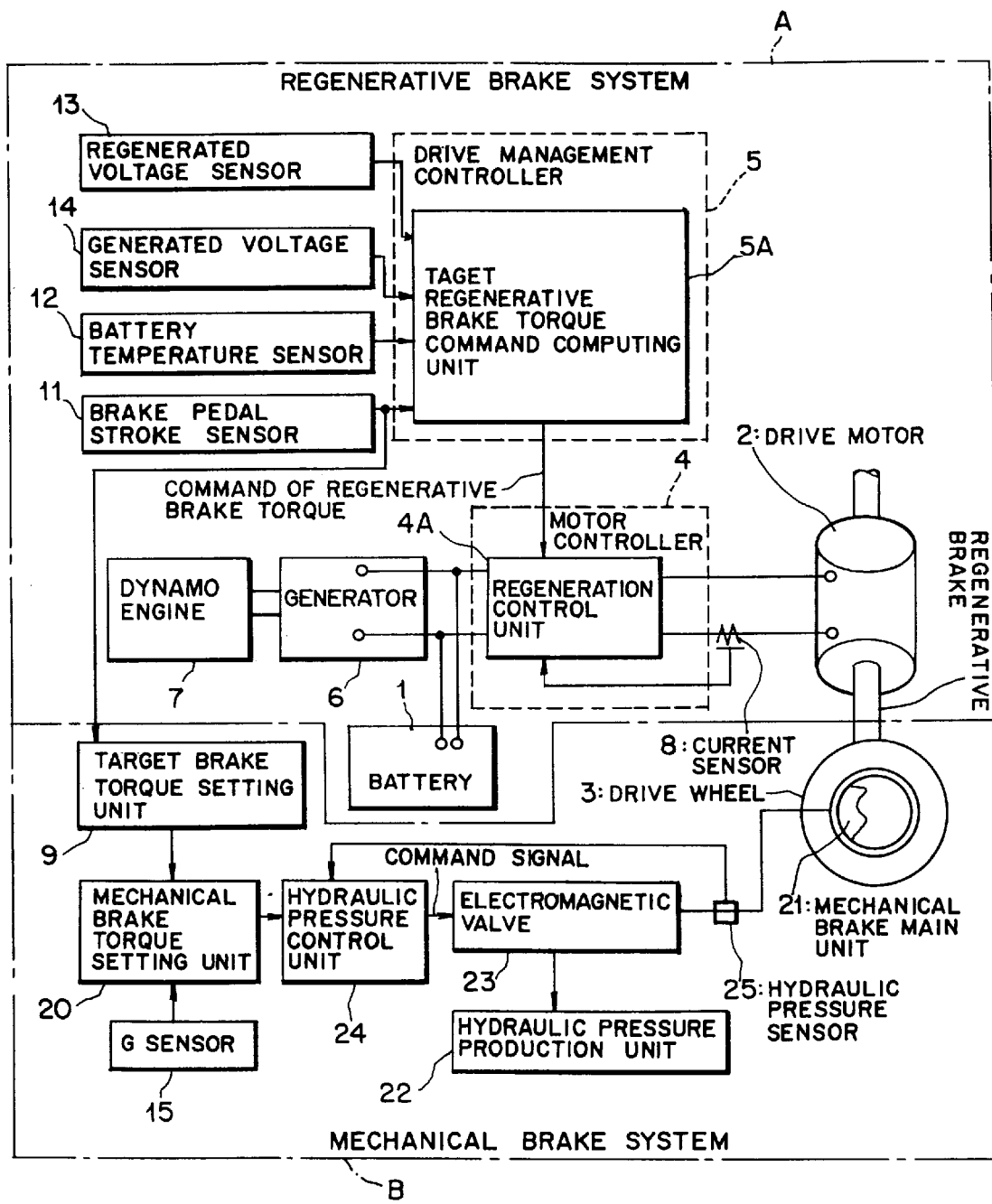
FIG. 1 is a block diagram showing a braking control system according to one embodiment of the present invention for an electric automobile.
Figure 2:
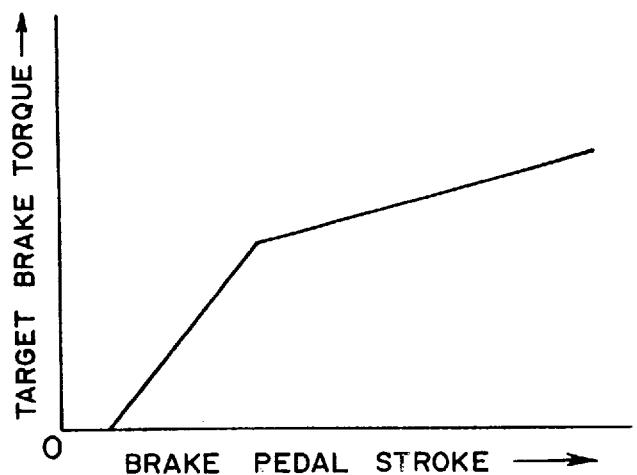
FIG. 2 is a diagram showing characteristics of a target braking force by the braking control system according to the one embodiment of the present invention for the electric automobile.

FIG. 1 is the block diagram showing the braking control system according to the preferred embodiment of the present invention for the electric automobile. As illustrated in FIG. 1, the brake system is provided with a regenerative brake system A and a mechanical brake system B.

A description will first be made of the regenerative brake system A. In FIG. 1, there are shown a battery 1, a drive motor 2, a drive wheel 3, and a motor controller 4. The motor controller 4 controls a supply of electric power from the battery 1 to the motor 2 during power running, but performs control of regeneration so that the motor 2 regenerates as a generator during regeneration.

The motor controller 4 controls the motor 2 in accordance with a control signal from a drive management controller 5. Described specifically, the drive management controller 5 commands control of a supply of electric power to the motor 2 during power running so that a motor output corresponding to a degree of depression of an unillustrated accelerator pedal is produced, but during regeneration, commands control of a state of power generation by the motor 2 so that a required regenerative braking force can be obtained. While monitoring a current to the motor 2 by a current sensor 8, the motor controller 4 controls a supply of the current and the state of power generation so that the motor 2 operates in accordance with the command.

Further, a generator 6 of the type driven by an internal combustion engine is mounted on the electric automobile, so that the electric automobile is constructed as a series hybrid electric motor which can perform power-generating running by driving the generator 6 with a dynamo internal combustion engine 7 (a dynamo engine 7). These generator 6 and dynamo engine 7 are also controlled by the drive management controller 5 on the basis of information from an unillustrated remaining battery capacity meter, so that power generation is conducted when the remaining capacity of the battery 1 drops to a predetermined level.

For the above-mentioned regenerative braking, the motor controller 4 is provided with a regeneration control unit 4A while the drive management controller 5 is provided with a target regenerative brake torque command computing unit 5A. Regeneration control means is constituted by these regeneration control unit 4A and regenerative brake torque command computing unit 5A.

At the target regenerative brake torque command computing unit 5A, a target regenerative braking force (target regenerative brake torque) is set based on detection signals from a brake pedal stroke sensor (brake operation degree detection means) 11 for detecting a stroke (a degree of depression) of a brake pedal (not illustrated), a battery temperature sensor (battery temperature detection means) 12, a regenerated voltage detection sensor (regenerated voltage detection means) 13 and generated voltage detection sensor (generated voltage detection means) 14, respectively.

Among these setting elements for the target regenerative brake torque, the battery temperature sensor 12, the regenerated voltage detection sensor 13, and the generated voltage detection sensor 14 set a regenerative brake limiting factor a. This regenerative brake torque limiting factor a is set smaller as a battery temperature TB rises, and set smaller as a regenerated voltage VK increases and the ratio of the regenerated voltage VK to a generated voltage VG (VK/VG) becomes greater.

Namely, when the battery temperature TB is equal to or lower than a predetermined temperature and the voltage ratio (VK/VG) is equal to or lower than a predetermined value (<<1), it is unnecessary to limit regenerative braking so that the limiting factor a is set at 1. However, when the battery temperature TB becomes higher, it becomes necessary to limit or stop charging so that the battery can be protected from deterioration. The limiting factor a is therefore set smaller than 1. Further, when the voltage ratio (VK/VG) becomes higher, the load on the generator becomes smaller so that the internal combustion engine is induced to operate at an overspeed. To avoid this potential trouble, the limiting factor a is set smaller than 1.

When the battery temperature TB is equal to or higher than a predetermined upper limit or the voltage ratio (VK/VG) is equal to or greater than a predetermined upper limit (>1), the limiting factor a becomes 0 so that regeneration is stopped.

Figure 3:
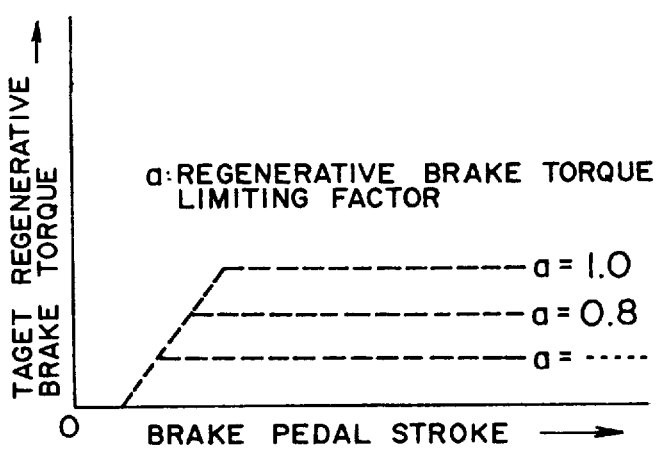
FIG. 3 is a diagram showing characteristics of a target regenerative braking force by the braking control system according to the one embodiment of the present invention for the electric automobile.

FIG. 3 illustrates a map for setting a target regenerative brake torque. When the brake is operated, a target regenerative brake torque rises as soon as the operation of the brake has reached a predetermined stroke, and the regenerative brake torque increases with the brake stroke. However, an upper limit of the target regenerative brake torque is determined by the limiting factor a so that the target regenerative brake torque is not set at the upper limit or greater.

In the mechanical brake system B, on the other hand, operation of a mechanical brake main unit 21 equipped with means for applying a frictional force to the wheel, for example, brake discs or the like is hydraulically controlled. Described specifically, a hydraulic drive pressure for the mechanical brake main unit 21 is supplied from a hydraulic pressure production unit 22 through an electromagnetic valve 23. The electromagnetic valve 23 is operated by a command signal from a hydraulic pressure control unit 24 as mechanical braking control means.

Based on a mechanical braking force (mechanical brake torque) set by a mechanical brake torque setting unit (mechanical braking force setting means) 20, the hydraulic pressure control unit 24 controls operation of the mechanical brake main unit 21 through the electromagnetic valve 23.

Based on information set by the target brake torque setting unit (target braking force setting means) 9 and detection information from a G sensor 15 as deceleration detecting means for detecting a deceleration of a vehicle, the mechanical brake torque setting unit 20 sets a mechanical brake torque. On the other hand, the target brake torque setting unit 9 sets a target braking force for the vehicle (target brake torque), for example, with characteristics such as those shown in FIG. 2 in accordance with detection information (brake pedal stroke) from the brake pedal stroke sensor 11.

When a brake torque is applied by regenerative braking, the vehicle undergoes a deceleration (deceleration G) in accordance with the brake torque. Accordingly, a deceleration detected by the G sensor 15 corresponds an actual regenerative brake torque. The mechanical brake torque setting unit 20 therefore sets a mechanical brake torque by subtracting the actual regenerative brake torque, which corresponds to the deceleration, from the target brake torque.

Incidentally, the G sensor 15 can be of the type that a deceleration is detected by detecting a displacement of a weight, of the type that a deceleration is calculated by differentiating a rotational speed of a wheel, a propeller shaft or the like, or of the type that uses the above detection and calculation in combination. Irrespective of the type, any known G sensor can be adopted insofar as it can detect a deceleration of a vehicle.

Accordingly, if an actual regenerative brake torque, equal to a target brake torque is obtained, the mechanical brake torque becomes 0 (none) so that the mechanical brake will not be operated. If an actual regenerative brake torque does not reach a target brake torque, the insufficient brake torque will be replenished by a mechanical brake torque. If no regenerative brake torque can be applied, this is surely reflected to a deceleration so that a target brake torque will be applied entirely by a mechanical brake torque.

The hydraulic pressure control unit 24 controls the electromagnetic valve 23 so that a hydraulic pressure corresponding to the thus-set mechanical brake torque is applied to the mechanical brake main unit 21. Here again, control is performed to apply the predetermined hydraulic pressure to the mechanical brake main unit 21 while detecting the hydraulic pressure to be supplied to the mechanical brake main unit 21 by a hydraulic pressure sensor 25.

Figure 4:
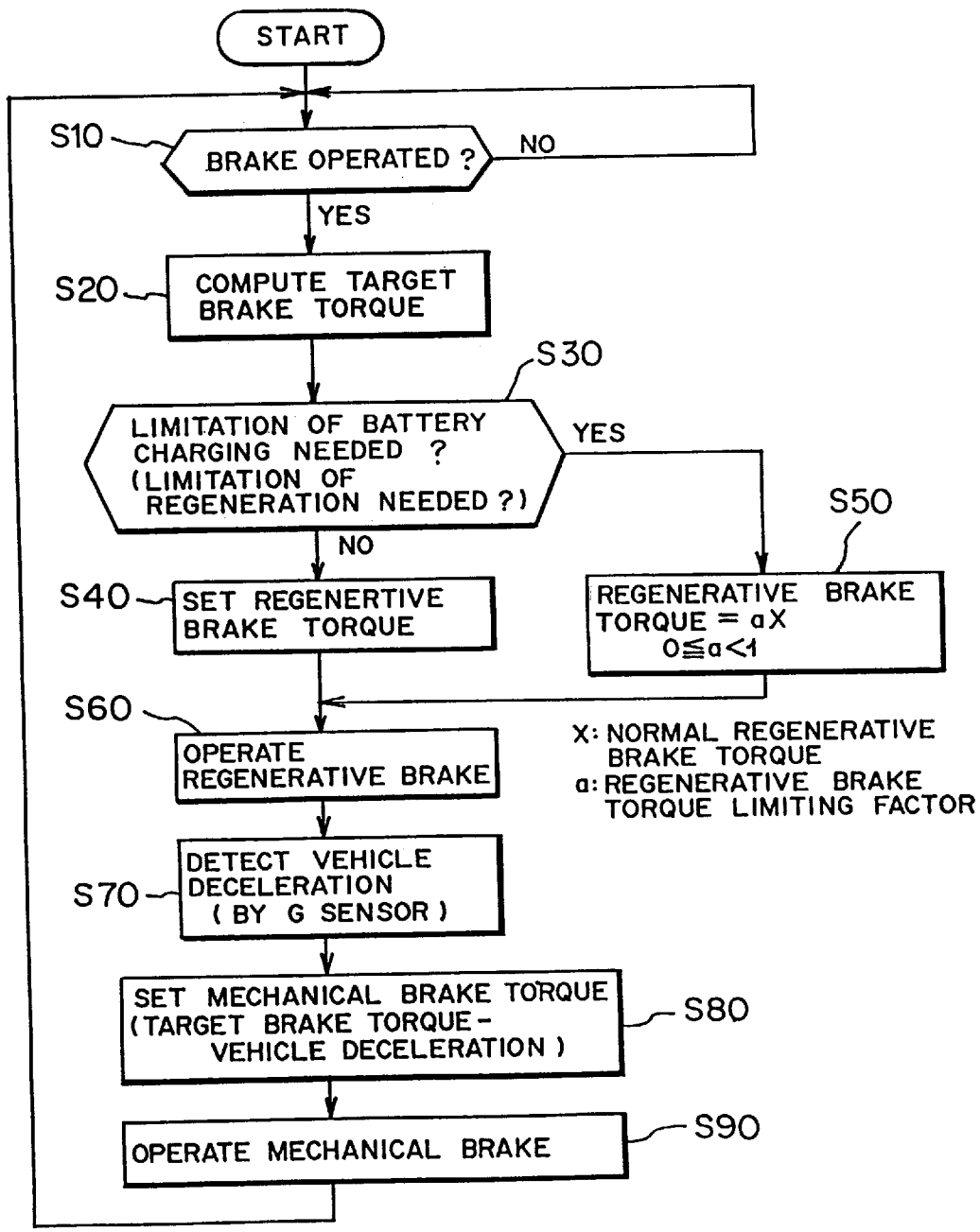
FIG. 4 is a flow chart illustrating control of braking by the braking control system according to the one embodiment of the present invention for the electric automobile.

Since the braking control system according to the perferred embodiment of the present invention for the electric automobile is constructed as described above, control of braking is performed, for example, as shown in FIG. 4.

When the brake is operated, namely, the brake pedal is depressed, this is determined in step S10 and a target brake torque is first computed in step S20. It is then determined whether a limitation of battery charging is needed (in other words, a limitation of normal regeneration is needed) (step S30). If no limitation is needed, a target regenerative brake torque is set in accordance with a brake pedal stroke in step S40. If a limitation is needed, a target regenerative brake torque is set in accordance with a brake pedal stroke and a limiting factor a in step S50. Of course, the target regenerative brake torque may become 0 (none) depending on the limiting factor a.

Corresponding to this target regenerative brake torque, the regenerative brake is then operated (step S60). A deceleration of the vehicle is then detected by the G sensor 15 (step S70), and a torque corresponding to the deceleration of the vehicle is subtracted from the target brake torque determined in step S20, whereby a mechanical brake torque is computed (step S80). Corresponding to this mechanical brake torque, the mechanical brake is operated (step S90).

Figure 5:
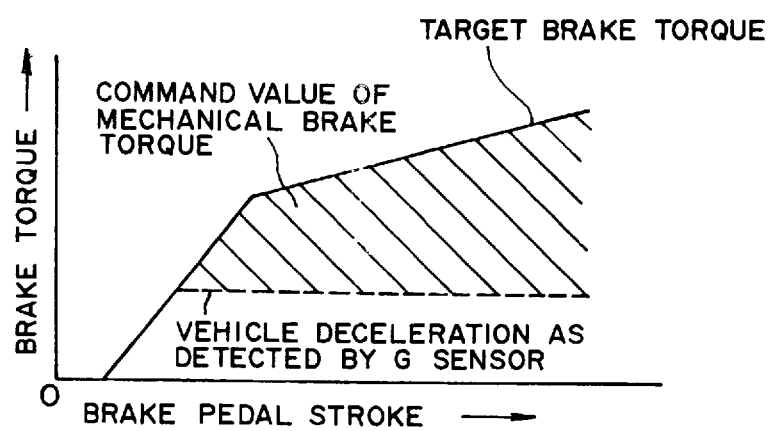
FIG. 5 is a diagram showing characteristics of a command of a mechanical braking force by the braking control system according to the one embodiment of the present invention for the electric automobile.

For example, if a regenerative brake torque equal to a target regenerative brake torque corresponding to a brake pedal stroke is obtained, the mechanical torque to be applied becomes equal to a value obtained by subtracting the target regenerative brake torque from the target brake torque, and is indicated as a height of an area, which is indicated by hatching in FIG. 5, at the brake pedal stroke.

However, a regenerative brake torque equal to a target regenerative brake torque corresponding to a brake pedal stroke is not always available. Described specifically, when the temperature of the battery is high, it is necessary to limit or stop the charging so that the battery is protected from deterioration. At this time, it is necessary to limit or stop regenerative braking. Further, in a hybrid electric automobile which carries a generator driven by an internal combustion engine and can run while charging a battery by the generator, a rise of a charging voltage by regeneration beyond a voltage generated by the generator during generation of electric power brings the generator into a no-load state, so that the internal combustion engine may be operated at an overspeed and may develop trouble. Here too, it is necessary to limit or stop regenerative braking.

No brake torque can be obtained either by regenerative braking when a trouble occurs in a control circuit for regenerative braking.

As described above, there is the possibility that no regenerative braking force may be obtained even if the brake pedal is operated. As the braking control system replenishes a deficiency in regenerative braking by a mechanical brake torque in accordance with a deceleration of the vehicle, which occurs as a result of application of regenerative braking, that is, in accordance with an actual regenerative brake torque, the braking control system has the advantage that a target brake torque can always be applied surely.

Needless to say, insofar as regenerative braking is feasible, a braking force available by the regenerative braking is used. This has the advantages that the recovery of energy by regeneration can be fully performed and wearing of the mechanical brake can be reduced.

Incidentally, in the case of an electric automobile equipped with a transmission, the prior art requires to correct a mechanical brake torque in accordance with a shift position because the regenerative braking force varies depending on the shift position. According to the system of the present invention, a mechanical brake torque is always set in accordance with a regenerative brake torque to be produced actually so that such a correction is not needed.

CAPABILITY OF EXPLOITATION IN INDUSTRY

According to the braking control system of the present invention for the electric automobile, when a regenerative braking force is not available despite of operation of the brake pedal, a mechanical braking force is produced to replenish the unavailable braking force. Therefore a target braking force can always be applied surely, thereby substantially improving the reliability of the brake system in the electric automobile of the type that a regenerative braking force is used as a braking force. Further, a target regenerative braking force based on a brake pedal stroke can be lowered as the battery temperature rises. This makes it possible to assure a sufficient braking force while reducing the temperature-dependent deterioration of the battery. Further, the target regenerative braking force based on the brake pedal stroke can be reduced when a regenerated voltage exceeds a generated voltage. This makes it possible to assure a sufficient braking force while protecting an internal combustion engine for a generator. It is therefore possible to improve the braking performance and to improve the operating performance of the electric automobile while assuring good overall performance for the electric automobile.

We claim:

1. A braking control system for an electric automobile, said braking control system combining a use of regenerative braking by a motor and mechanical braking by a mechanical brake system upon application of brakes, comprising:

brake pedal stroke detection means for detecting a stroke of a brake pedal;

target braking force setting means for setting a target braking force on a basis of the brake pedal stroke detected by said brake pedal stroke detection means;

regeneration control means for setting a target regenerative braking force on a basis of the brake pedal stroke detected by said brake pedal stroke detection means, and controlling regenerative braking by said motor in accordance with said set target regenerative braking force;

deceleration detecting means for detecting a deceleration of the automobile; and mechanical braking control means for controlling operation of said mechanical braking system, after initiation of the regenerative braking, in accordance with a difference between said target braking force and an actual braking force determined based on the detected deceleration from said deceleration detecting means.

2. The braking control system according to claim 1, further comprising:

battery condition detecting means for detecting a condition of a battery, wherein said regeneration control means sets the target regenerative braking force in accordance with the brake pedal stroke detected by said brake pedal stroke detection means and the condition of said battery detected by said battery condition detecting means.

3. The braking control system according to claim 2, wherein said battery condition detecting means detects a temperature of said battery, and said regeneration control means reduces said set target regenerative braking force as the temperature of said battery increases.

4. The braking control system according to claim 1, further comprising:

regenerated voltage detection means for detecting a voltage regenerated by said motor; and generated voltage detection means for detecting a voltage generated by a generator driven by an internal combustion engine to charge a battery, wherein said regeneration control means reduces said set target regenerative braking force when the regenerated voltage exceeds the generated voltage.

5. A brake control method for an electric automobile having a regenerative braking system, which includes a motor for regenerating power, and a mechanical braking system, comprising:

detecting a depression stroke of a brake pedal;

setting a target braking force based on said detected stroke of the brake pedal;

setting a target regenerative braking force based on said detected stroke of the brake pedal;

controlling the regenerative braking based on said set target regenerative braking force;

decelerating the automobile by the regenerative braking;

detecting an actual deceleration of the automobile; and controlling the mechanical braking system, after initiation of said regenerative braking, based on a difference between said set target braking force and an actual braking force determined based on said detected actual deceleration of the automobile.

6. The method of claim 5, further comprising:

detecting a condition of a battery, wherein said step for setting said target regenerative braking force sets said target regenerative braking force based on said detected depression stroke and said detected battery condition.

7. The method of claim of claim 6, wherein said step for detecting the condition of the battery detects a temperature of the battery, and said step for setting said target regenerative braking force reduces said set target regenerative braking force as said detected temperature of the battery increases.

8. The method of claim 1, further comprising:

detecting a first voltage regenerated by the motor; and detecting a second voltage generated by a generator driven by an internal combustion engine to charge a battery, wherein said step for setting said target regenerative braking force reduces said set target regenerative braking force when said first voltage exceeds said second voltage.

* * * * *